United States Patent [19]

Morinaga

[11] Patent Number: 4,865,244

[45] Date of Patent: Sep. 12, 1989

[54] SOLDER-CONTAINING HEAT-SHRINKABLE TUBE

[75] Inventor: Hayato Morinaga, Osaka, Japan

[73] Assignee: Sumitomo Electric Industries, Ltd., Osaka, Japan

[21] Appl. No.: 230,232

[22] Filed: Aug. 9, 1988

[30] Foreign Application Priority Data

Aug. 31, 1987 [JP] Japan .................. 62-133769[U]
May 25, 1988 [JP] Japan .................. 63-69813[U]

[51] Int. Cl.$^4$ ............................................. B23K 35/36
[52] U.S. Cl. .................................................. 228/56.3
[58] Field of Search ............... 228/56.3, 180.2, 56.3; 174/84 R, DIG. 8; 29/447

[56] References Cited

U.S. PATENT DOCUMENTS

| | | | |
|---|---|---|---|
| 3,305,625 | 2/1967 | Ellis | 228/56.3 |
| 3,316,343 | 4/1967 | Sherlock | 228/56.3 |
| 3,320,355 | 5/1967 | Booker | 228/56.3 |
| 3,678,174 | 7/1972 | Ganzhorn | 228/56.3 |
| 4,624,866 | 11/1986 | Cheng et al. | 228/56.3 |

Primary Examiner—M. Jordan
Attorney, Agent, or Firm—Wenderoth, Lind & Ponack

[57] ABSTRACT

A heat-shrinkable tube containing a solder piece in the form of a plate. The solder piece is mounted so that its both sides are parallel to the longitudinal axis of the tube. Its both ends are held in the recesses formed by heat in the inner wall of the tube at opposite positions. The flux for the solder piece is embedded in the solder piece and has its both ends sealed by the inner wall of the tube without being exposed to the atmosphere.

1 Claim, 3 Drawing Sheets

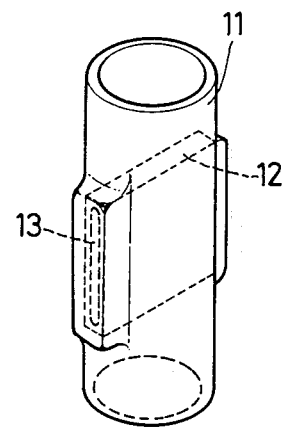
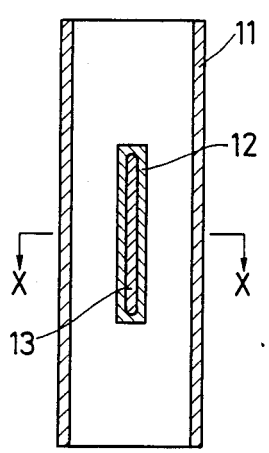
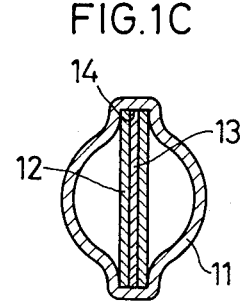
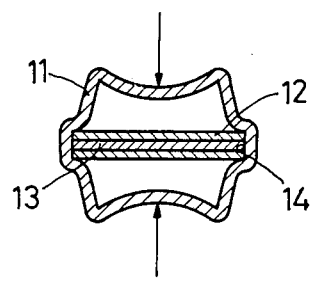
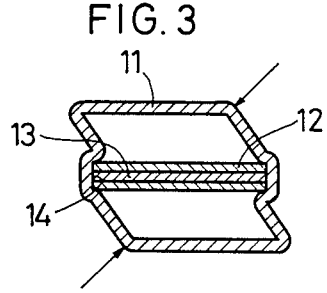
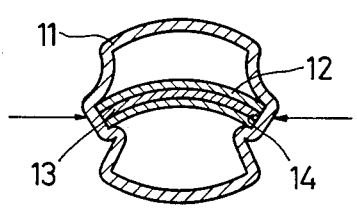
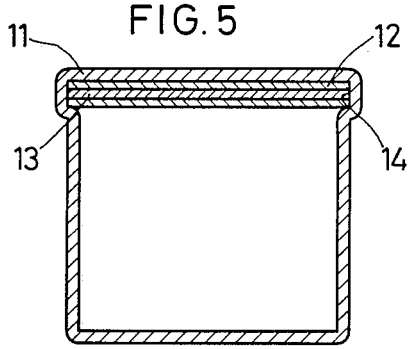

SOLDER-CONTAINING HEAT-SHRINKABLE TUBE

BACKGROUND OF THE INVENTION

The present invention relates to a solder-containing heat-shrinkable tube used to connect electric wires or cables.

A solder-containing heat-shrinkable tube can solder and connect wires together and at the same time cover and protect the soldered portion with its tube adapted to shrink with soldering heat. It is therefore widely used for a permanent connection of electric wires. A ring-shaped solder piece is mounted in a heat-shrinkable tube as disclosed in e.g. Japanese Patent Publication No. 58-74245.

When connecting electric wires together with a solder-containing heat-shrinkable tube, wire ends are inserted into the tube while gripping the tube by a human or machine hand. Thus, the tube undergoes an external stress which tends to deform the solder piece in the tube. The deformed solder piece might chip off by contact with the wire ends. The solder piece in the conventional tube is prone to deformation because the solder and the tube contact each other along most of the entire inner circumference of the tube.

FIG. 6B shows one example of the prior art tube in which a solder ring 2 is in contact with a heat-shrinkable tube 1 over its entire inner circumference. FIG. 7 shows how the solder ring is deformed when subjected to an external force.

FIG. 8 shows another prior art tube in which the solder piece is inclined with respect to the tube with a smaller contact area on the inner wall of the tube. As shown in FIG. 9, it is liable to deformation under an external force, too.

The first object of the present invention is to provide a solder-containing heat-shrinkable tube in which the solder piece will not drop off due to deformation by external force.

The solder piece for use in a heat-shrinkable tube usually has a flux for good adhesion. The flux is either embedded in the solder piece or applied to its outer surface. In either case, the flux is exposed to the atmosphere in the conventional tube of this type.

FIGS. 10 and 11 show examples of such prior art tubes. In FIGS. 10A–10C, a heat-shrinkable tube 1 contains a ring-shaped solder piece 2 and a flux 3 embedded in the solder piece. The flux is exposed to the atmosphere even after the solder piece has been mounted.

In FIGS. 11A–11C, the heat-shrinkable tube 1 contains a solder piece 2 covered with a flux 3. The flux is in direct contact with the atmosphere at most of its outer periphery.

As the flux, an organic acid, amine, or amine halogenated hydracid family flux may be used. The flux of any type serves to remove any oxide layers on the wires to be connected and the solder piece. The function proceeds when it ionizes. The flux which is in a solid state at normal temperature ionizes rapidly when it melts with heat during use.

The flux ionizes gradually even while in storage by absorbing water in the air. The ionized component is consumed to remove only the oxide layer on the solder piece. Since the flux is thus consumed gradually while in storage, it cannot remove completely the oxide layers on the wires to be connected. This results in incomplete soldering. Thus, a conventional solder-containing heat-shrinkable tube has only a limited shelf life.

The simplest approach to this problem was to put a drying agent in its package. But such a method serves only to prolong its storage life up to about 10–40 per cent and is far away from a fundamental solution.

The second object of the present invention is to provide a solder-containing heat-shrinkable tube which can effectively protect the flux from deterioration and which has a longer storage life.

SUMMARY OF THE INVENTION

According to the present invention, the solder piece is held in the recess formed in the inner wall of the tube.

According to the present invention, the surface of the flux not covered with the solder plate are sealed with the tube. Since the flux is thus completely isolated from the atmosphere, it will not absorb and react with water in the air to ionize. Thus, the flux can maintain its properties stably for an extended period of time without deteriorating.

Other features and objects of the present invention will become apparent from the following description taken with reference to the accompanying drawings, in which:

BRIEF DESCRIPTION OF THE DRAWINGS

FIG. 1A is a perspective view of the solder-containing heat-shrinkable tube according to the present invention;

FIG. 1B is a vertical sectional view of the same;

FIG. 1C is a horizontal sectional view of the same;

FIGS. 2 and 3 are explanatory views showing that the solder piece is not deformed if an external force acts on the tube;

FIG. 4 is a view showing the only example in which an external force can deform the solder piece;

FIG. 5 is a sectional view of the second embodiment; and

DETAILED DESCRIPTION OF THE PREFERRED EMBODIMENT

Figure 6A:
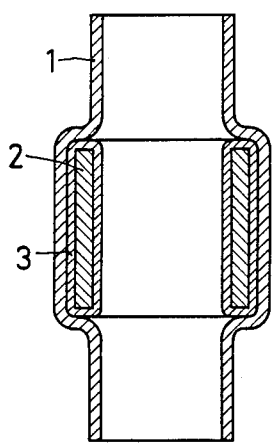
FIG. 6A is a longitudinal sectional view of a prior art heat-shrinkable tube.
Figure 8A:
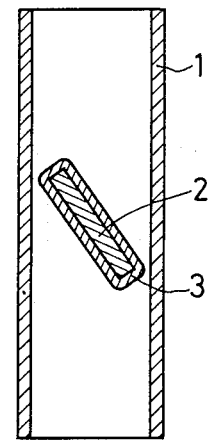
FIG. 8A is a longitudinal sectional view of another prior art tube.
Figure 6B:
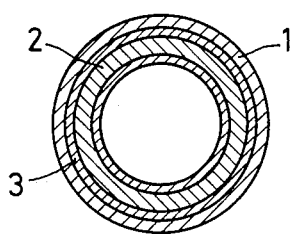
FIG. 6B is a transverse sectional view of the prior art tube of FIG. 6A
Figure 8B:
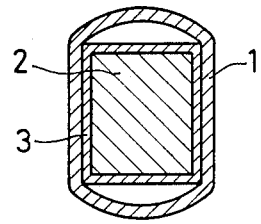
FIG. 8B is a transverse sectional view of the prior art tube of FIG. 8A
Figure 7:
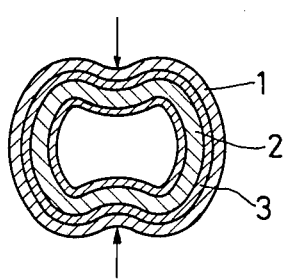
FIG. 7 is a similar view showing how the tube of FIG. 6A is deformed under an external force.
Figure 9:
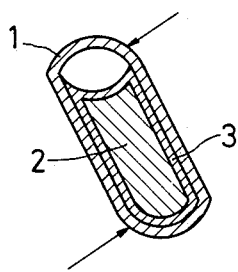
FIG. 9 is a similar view showing how the same is deformed under an external force.
Figure 10A:
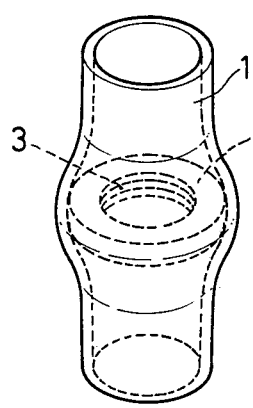
FIG. 10A is a perspective view of another prior art tube.
Figure 10B:
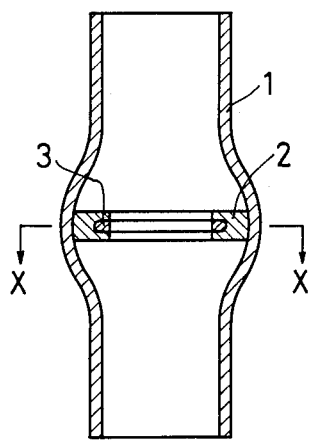
FIG. 10B is a longitudinal sectional view of the prior art tube of FIG. 10A.
Figure 10C:
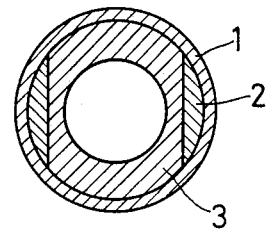
FIG. 10C is a transverse sectional view of the tube of FIG. 10A.
Figure 11A:
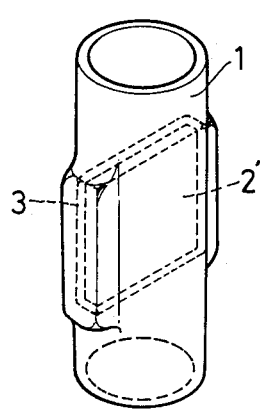
FIG. 11A is a perspective view of a still another prior art tube.
Figure 11B:
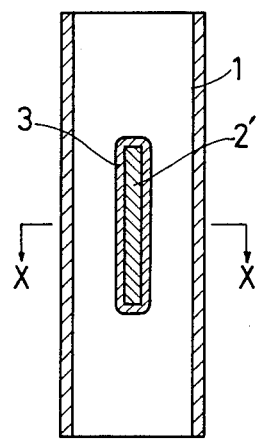
FIG. 11B is a longitudinal sectional view of the prior art tube of FIG. 11A.
Figure 11C:
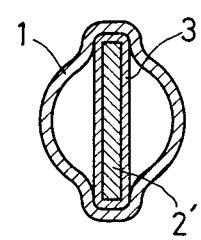
FIG. 11C is a transverse sectional view of the tube of FIG. 11A.

Figs 1A–1C show the first embodiment of the present invention in which a heat-shrinkable tube 11 has a plateshaped solder piece 12 mounted therein so that its front and back surfaces will be in parallel with the axis of the tube. (FIG. 1B) When the tube shrinks by heat, it is pressed outwardly at its opposite portions by the end faces of the solder plate 12 to form recesses 14. The solder plate 12 is securely held in the recesses 14. (FIG. 1C)

A flux 13 is embedded in the solder plate 12 in such a manner that only its opposite end faces are exposed. These exposed portions are sealed by the inner wall of the tube when the tube shrinks by heat and the inner surface of the tube 11 is pressed against the solder plate. Thus the flux 13 is kept from direct contact with the atmosphere even during storage.

The solder plate 12 is in contact with the tube only at the recesses 14. Any external force acting on the tube at portions other than the recessed portions 14 would not cause the solder plate 12 to be deformed. Only when the tube undergoes an external force at the recessed portions 14, the solder plate can be deformed.

In FIGS. 2 and 3, external stresses are acting on the tube at portions other than the recessed portions 14. Thus the solder plate 12 is not deformed. FIG. 4 shows the only possible external stress which can deform the solder plate 12.

EXAMPLE 1

A solder plate 0.4 mm thick and 2 mm long was fitted in a heat-shrinkable tube having an inner diameter of 2.5 mm so as to be disposed in its central portion. The tube was heated until its inner diameter was reduced to 1.5 mm so as to hold the solder plate tightly therein. It was confirmed that the solder plate 12 can keep its shape unchanged as shown in FIG. 1C even if the tube is subjected to an external force at other portions than the portions in contact with the solder plate 12.

EXAMPLE 2

A solder piece 12 in the shape of a plate 0.5 mm thick and 6.5 mm long was fitted in a heat-shrinkable tube having a square cross-section with each side 7 mm long. The tube was then heated until each side length was reduced to 6 mm, to obtain a solder-containing heat-shrinkable tube. Any external force which acts on the tube at any other portions than the portion in contact with the solder piece did not cause the solder piece 12 to be deformed.

EXAMPLE 3

A solder plate measuring 0.4 mm in thickness, 2 mm in length, and 1 mm in width and containing a flux piece having its both ends exposed in the center of the 0.4 mm×1 mm end surfaces of the solder plate was mounted in a heat-shrinkable tube having an inner diameter of 2.5 mm. The tube was then heated to reduce its inner diameter to 1.5 mm. The solder-containing heat-shrinkable tube shown in FIGS. 1A–1C was thus obtained.

One hundred of such tubes were prepared and stored in a tank having a temperature of 40° C. and a humidity of 90 per cent for 60 days. Then they were used for the connection of two bare copper wires having an outer diameter of 0.5 mm. The lap of the wires was 5 mm.

A 5 kg-f tension was applied to each of one hundred of the connected samples thus obtained. It was confirmed that none of them showed breakage of the solder connection. In contrast, in the experiment using conventional soldercontaining heat-shrinkable tubes having part of the flux surface left exposed and kept under the same conditions, six out of one hundred connected samples suffered breakage at the solder connection.

According to the present invention, when the heat-shrinkable tube shrinks with heat, both ends of the solder plate abut the inner surface of the tube to form recesses therein in which the solder plate is held tightly. With this arrangement, the solder plate is less susceptible to external force and less liable to deform and crack.

Since the flux piece has its exposed surfaces sealed with the heat-shrinkable tube, that is, a material having a lower melting point than the flux, it is effectively protected from deterioration before use. Thus the shelf life is greatly extended. Further, this will allow massproduction as well as transportation by sea which has hitherto been shied away because the prior art solder-containing tubes tend to dampen easily.

What is claimed is:

1. A flux-and-solder-containing heat-shrinkable tube comprising:

a tube of a heat-shrinkable material;
a pair of spaced opposed recesses defined in an inner wall of said heat-shrinkable tube for receiving a plate-like solder piece therein;
a plate-like solder piece received in said pair of spaced opposed recesses in the inner wall of said heat-shrinkable tube, said solder piece including a flux for said solder piece substantially embedded within said solder piece, and flux having at least one solder-free face, said plate-like solder piece being substantially parallel to the longitudinal axis of said heat-shrinkable tube, and said at least one solder-free face of said flux substantially embedded in said solder piece being received in one recess of said pair of spaced opposed recesses for causing said at least one solder-free face of said flux to be protected from contact with the atmosphere for preventing oxidation of said flux.

* * * * *